United States Patent
Camps et al.

(10) Patent No.: US 9,467,213 B1
(45) Date of Patent: *Oct. 11, 2016

(54) METHODS AND APPARATUS FOR INDIVIDUALLY CONTROLLING POWER SPECTRAL DENSITY (PSD) PER TRANSMISSION PORT IN MIMO TRANSMITTERS

(71) Applicant: Marvell International Ltd., Hamilton (BM)

(72) Inventors: Carlos Camps, Xirivella (ES); Salvador Iranzo Molinero, Valencia (ES)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,137

(22) Filed: Feb. 2, 2016

Related U.S. Application Data

(63) Continuation of application No. 14/600,131, filed on Jan. 20, 2015, now Pat. No. 9,281,879.

(60) Provisional application No. 61/931,441, filed on Jan. 24, 2014.

(51) Int. Cl.
  *H04B 7/02* (2006.01)
  *H04B 7/04* (2006.01)
  *H04L 5/00* (2006.01)

(52) U.S. Cl.
  CPC .......... *H04B 7/0426* (2013.01); *H04B 7/0417* (2013.01); *H04B 7/0456* (2013.01); *H04L 5/0007* (2013.01)

(58) Field of Classification Search
  None
  See application file for complete search history.

(56) References Cited

U.S. PATENT DOCUMENTS

| | | |
|---|---|---|
| 2009/0203335 A1 | 8/2009 | Lee et al. |
| 2011/0243273 A1 | 10/2011 | Song et al. |
| 2013/0129017 A1 | 5/2013 | Sahin et al. |
| 2013/0267181 A1 | 10/2013 | Ayatollahi et al. |

*Primary Examiner* — Adolf Dsouza

(57) ABSTRACT

Systems and methods for controlling power spectral density (PSD) of a multiple-input-multiple-output (MIMO) transmitter are provided. Data corresponding to multiple transmission streams of the MIMO transmitter is received with precoding circuitry from a constellation encoder. The received data is precoded using the precoding circuitry. The precoded data is sent to a plurality of transmission ports of the MIMO transmitter. Power allocation of the precoded data is adjusted for a first of the plurality of transmission ports independently of adjusting power allocation of the precoded data for a second of the plurality of transmission ports.

18 Claims, 3 Drawing Sheets

METHODS AND APPARATUS FOR INDIVIDUALLY CONTROLLING POWER SPECTRAL DENSITY (PSD) PER TRANSMISSION PORT IN MIMO TRANSMITTERS

CROSS REFERENCE TO RELATED APPLICATIONS

This application is a continuation of U.S. patent application Ser. No. 14/600,131, filed Jan. 20, 2015 (currently pending), which claims the benefit of U.S. Provisional Application No. 61/931,441, filed Jan. 24, 2014, which are incorporated herein by reference in their entireties.

FIELD OF USE

The present disclosure relates generally to Multiple-Input-Multiple-Output (MIMO) transmitter and receiver systems and methods, and more particularly, to the individual control of power spectral density (PSD) for each transmission port.

BACKGROUND

Traditional MIMO transmitters provide power allocation to received transmission streams (e.g., using components of a constellation encoder) before those streams are precoded. Precoding is subsequently applied to the streams for which power allocation was provided and then the precoded data is sent to one of several transmission ports of the MIMO transmitter. Due to the fact that power allocation is provided before the transmission streams are sent to the transmission ports (e.g., before being precoded), power allocation cannot vary at any given time across the transmission ports. This makes such MIMO transmitters unsuitable for application in circumstances requiring different power allocations across antennas or outputs.

SUMMARY

Systems and methods for individually controlling PSD per transmission port in MIMO transmitters are provided. In some embodiments, data corresponding to multiple transmission streams of the MIMO transmitter is received with precoding circuitry from a constellation encoder. The received data is precoded using the precoding circuitry. The precoded data is sent to a plurality of transmission ports of the MIMO transmitter. Power allocation of the precoded data is adjusted for a first of the plurality of transmission ports independently of adjusting power allocation of the precoded data for a second of the plurality of transmission ports.

In some implementations, the precoded data corresponding to a first of the multiple transmission streams is sent from the precoding circuitry to first power allocation circuitry of the first transmission port. The precoded data corresponding to a second of the multiple transmission streams is sent from the precoding circuitry to second power allocation circuitry of the second transmission port.

In some implementations, power allocation circuitry of the constellation encoder is bypassed such that power allocation is not applied to the data received by the precoding circuitry. In some implementations, power allocation applied to the data sent from the constellation encoder to the precoding circuitry is scaled so that a same amount of power is applied to the data independently of a number of constellation bits used by the constellation encoder.

In some implementations, a determination is made that an amount of a signal transmitted by the first transmission port which has been reflected back to the MIMO transmitter is greater than an amount of a signal transmitted by the second transmission port which has been reflected back to the MIMO transmitter. The power allocation applied by the first transmission port may be increased up to a first ceiling value to be greater than the power allocation applied by the second transmission port up to a second ceiling value that is lower than the first ceiling value.

In some implementations, each of the plurality of transmission ports includes power allocation circuitry, an orthogonal-frequency-division-multiplexing (OFDM) modulator and cyclic prefix and windowing circuitry, and each of the plurality of transmission ports is associated with a respective one of a plurality of antennas of the transmitter. In some implementations, the amount by which power allocation of the first and second transmission ports is adjusted is based on interference of neighboring signals.

In some implementations, the received data is precoded by multiplying subcarriers of each of the transmission streams by a Singular Value Decomposition (SVD) of a channel matrix. In some implementations, power allocation of the precoded data is adjusted by modifying a first power value stored in a memory associated with first power allocation circuitry of the first transmission port and modifying a second power value stored in a memory associated with second power allocation circuitry of the second transmission port.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which.

DETAILED DESCRIPTION

Figure 1:
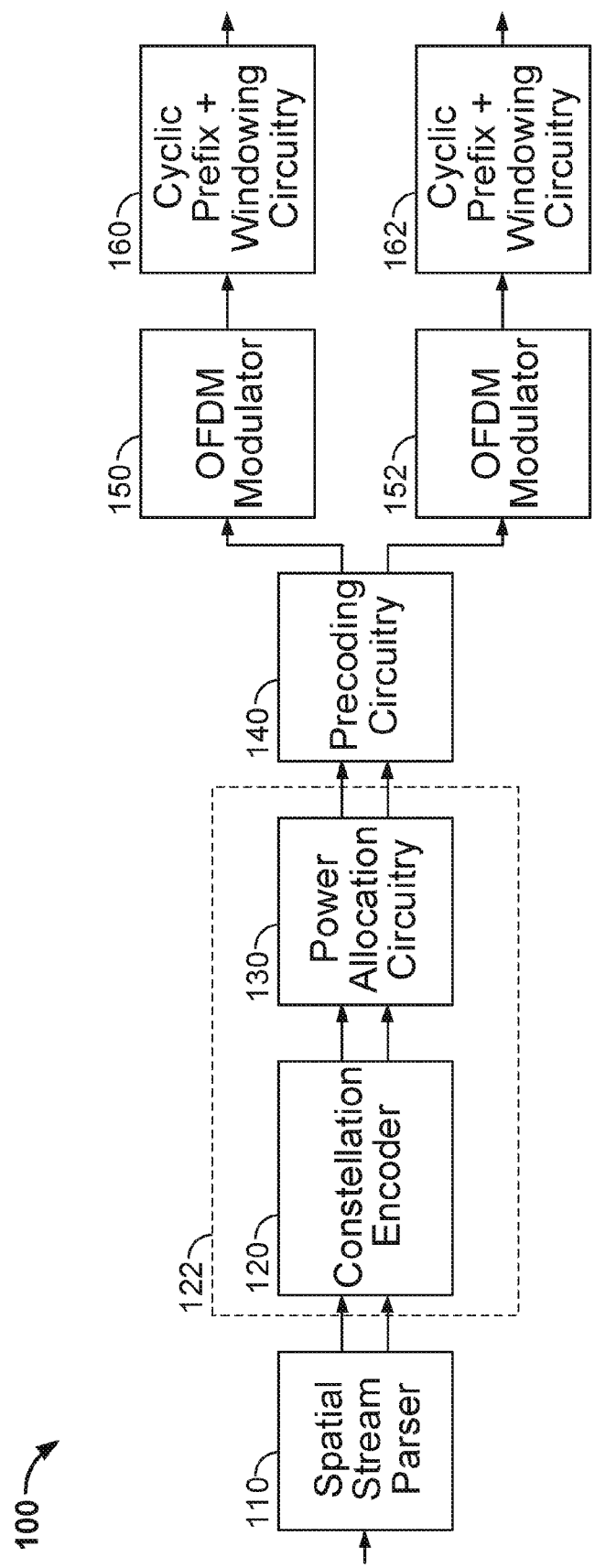
FIG. 1 is a diagram of a MIMO transmission system.

FIG. 1 is a diagram of a typical MIMO transmission system 100. System 100 includes a spatial stream parser 110, a constellation encoder subsystem 122, precoding circuitry 140, orthogonal-frequency-division-multiplexing modulators 150 and 152, and cyclic prefix and windowing circuitries 160 and 162. Spatial stream parser 110 receives an input stream of data and parses or splits the input data into a desired number of streams. Each stream may correspond to a given transmission port (or antenna). For example, in a system with two transmission ports, stream parser 110 may split or divide the input data into two streams (e.g., one stream for each of the two ports). Any number of transmission ports may be used that is equal to or greater than the number of streams created by stream parser 110. For example, the number of transmission ports N may be equal to or greater than the number of streams M created by stream parser 110.

The streams generated by stream parser 110 are sent to constellation encoder subsystem 122. Typically constellation encoder subsystem 122 includes a constellation encoder 120 and power allocation circuitry 130. Constellation encoder 120 and power allocation circuitry 130 may be part of the same component (e.g., circuit block). Constellation encoder 120 maps a particular stream to a given constellation point on a grid. Power allocation circuitry 130 multiplies the data of each stream output by constellation encoder 120 by a predetermined multiplier that is determined based on a desired power spectral density (PSD). Ultimately, the different transmission ports of system 100 transmit multiple signals simultaneously with the same PSD generated by power allocation circuitry 130. Constellation encoder subsystem 122 and other typical elements of system 100 are described in greater detail in U.S. Pat. Nos. 7,483,365 and 8,265,176 which are incorporated herein by reference in their entireties. Applying the same power allocation to each of the streams prior to being provided to precoding circuitry 140 ensures that the receiver is able to recover the transmitted data. Specifically, if different power allocations are applied to the different streams in constellation encoder subsystem 122 (e.g., prior to the signals being precoded), the transmission port signals generated by precoding circuitry 140 would not match what the receiving device expects. This would prevent the receiving device from correctly recovering the transmitted information.

The output of constellation encoder subsystem 122 is provided to precoding circuitry 140. Precoding circuitry 140 multiplies subcarriers of each transmission stream by a precoding matrix. The precoding matrix may be obtained based on a Singular Value Decomposition (SVD) of the channel matrix associated with transmission system 100. Multiplying the subcarriers of each transmission stream by the precoding matrix generates transmission port signals.

Subsequent to precoding the data and generating the transmission port signals, the transmission port signals are provided to a respective OFDM modulator 150 or 152. Each OFDM modulator 150 and 152 may correspond to a different transmitting antenna of transmission system 100. The outputs of OFDM modulator 150 and 152 are respectively applied to cyclic prefix and windowing circuitries 160 and 162. The outputs of cyclic prefix and windowing circuitries 160 and 162 are provided to respective antennas for transmission out of transmission system 100.

Figure 2:
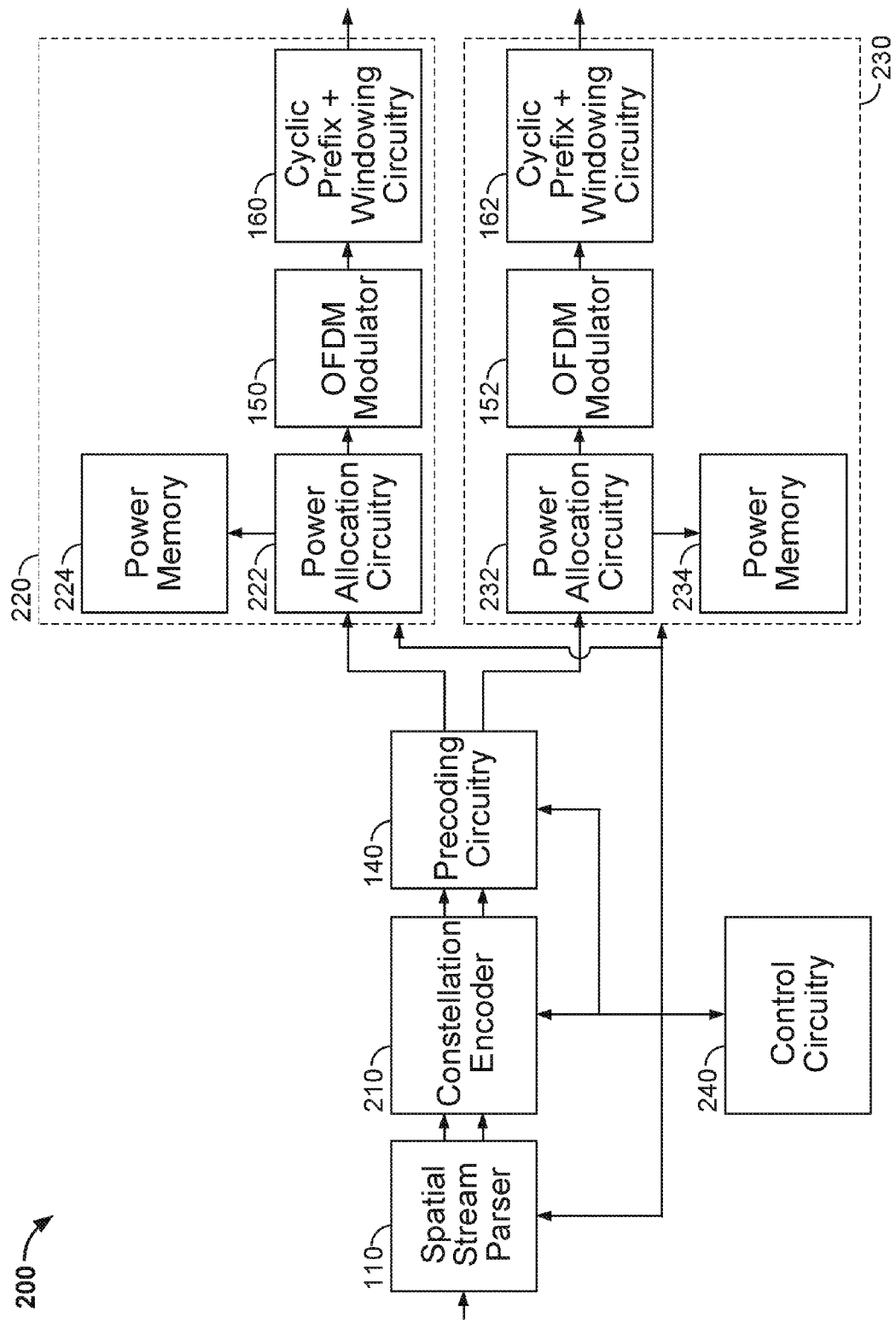
FIG. 2 is a diagram of an illustrative MIMO transmission system in accordance with an embodiment of the present disclosure.

FIG. 2 is a diagram of an illustrative MIMO transmission system 200 in accordance with an embodiment of the present disclosure. System 200 includes similar components as system 100 and such components are similarly labeled. Constellation encoder subsystem 122 is replaced by constellation encoder 210 and first and second power allocation circuitries 222 and 232 are also included in system 200. Specifically, system 200 includes spatial stream parser 110, constellation encoder 210, precoding circuitry 140, first and second transmission ports 220 and 230, and control circuitry 240. Each component in system 200 may be controlled or receive instructions from control circuitry 240.

The streams output by stream parser 110 may be provided or sent to constellation encoder 210. In some embodiments, constellation encoder 210 may only include the same or similar components as constellation encoder 120 (FIG. 1) and may not include power allocation circuitry 130. In some embodiments, constellation encoder 210 may include the same or similar components as constellation encoder subsystem 122 (e.g., may include both constellation encoder 120 and power allocation circuitry 130). In such circumstances, the output of constellation encoder 120 included in constellation encoder 210 may bypass power allocation circuitry 130 which is also included in constellation encoder 210 so that the signals coming out of constellation encoder 210 are directly provided to precoding circuitry 140. Alternatively, in such circumstances, power allocation circuitry 130 may not be bypassed but the power allocation applied by power allocation circuitry 130 may be set to '1' or some other value (e.g., such that power of the signal output by constellation encoder 120 is not increased). For example, constellation encoder 210 may include constellation encoder subsystem 122 with power allocation circuitry 130 being set to scale the constellation power such that the output has the same power regardless of the constellation number of bits that are used.

The output of constellation encoder 210 may be provided to precoding circuitry 140. The transmission port signals generated by precoding circuitry 140 are provided to respective first and second transmission ports 220 and 230. First transmission port 220 may include first power allocation circuitry 222 and first power memory 224 and second transmission port 230 may include second power allocation circuitry 232 and second power memory 234. First power allocation circuitry 222 may multiply a first precoded stream received from precoding circuitry 140 by a first value that is retrieved from power memory 224. Second power allocation circuitry 232 may multiply a second precoded stream received from precoding circuitry 140 by a first value that is retrieved from power memory 234. The value by which first power allocation circuitry 222 multiplies the first precoded stream may be different from that which second power allocation circuitry 322 multiplies the second precoded stream. As such, the power allocation applied to each precoded stream received by each respective transmission port 220 and 230 may be independently adjusted or controlled. Because the power allocation is applied to the precoded streams (rather than before the streams are precoded), the signals received by a receiver correspond to what the receiver expects and can be recovered.

In some embodiments, PSD ceilings may be applied to each transmission port. Specifically, first and second power allocation circuitries 222 and 232 may be set to provide different maximum amounts of power allocation.

In some embodiments, control circuitry 240 may adjust the power allocation provided by first and second power allocation circuitries 222 and 232 by modifying power values stored in power memories 224 and 234 respectively. For example, to increase the power allocation provided by first power allocation circuitry 222 to a value greater than that which second power allocation circuitry 232 applies, control circuitry 240 may increase the value stored in power memory 224 and/or decrease the value stored in power memory 234. In some implementations, control circuitry 240 may determine how much of a transmitted signal for a particular transmission port or antenna is reflected back. If the amount of the transmitted signal is greater than a given threshold, control circuitry 240 may increase the power allocation provided to the transmitted signal for the corresponding transmission port by increasing the value stored in the power memory for that port. Specifically, control circuitry 240 may increase the power allocation provided to the transmitted signal for a particular transmission port without adjusting the power allocation provided to the transmitted signal for another transmission port. In some implementations, control circuitry 240 may monitor interference caused by nearby transmission sources. Control circuitry 240 may adjust the power allocation provided by each power allocation circuitries 222 and 232 separately (e.g., to have different amounts of power allocation) to compensate for the interference of the nearby transmission sources. In some implementations, control circuitry 240 may monitor analog distortions associated with each transmission port. Control circuitry 240 may adjust the power allocation provided by each power allocation circuitries 222 and 232 separately (e.g., to have different amounts of power allocation) to compensate for the analog distortions associated with the transmission ports corresponding to the respective power allocation circuitry 222 and 232.

Following power allocation by first and second power allocation circuitries 222 and 234, respectively, the signals are provided to respective OFDM modulators 150 and 152 and cyclic prefix and windowing circuitries 160 and 162 to prepare the signals for transmission.

Figure 3:
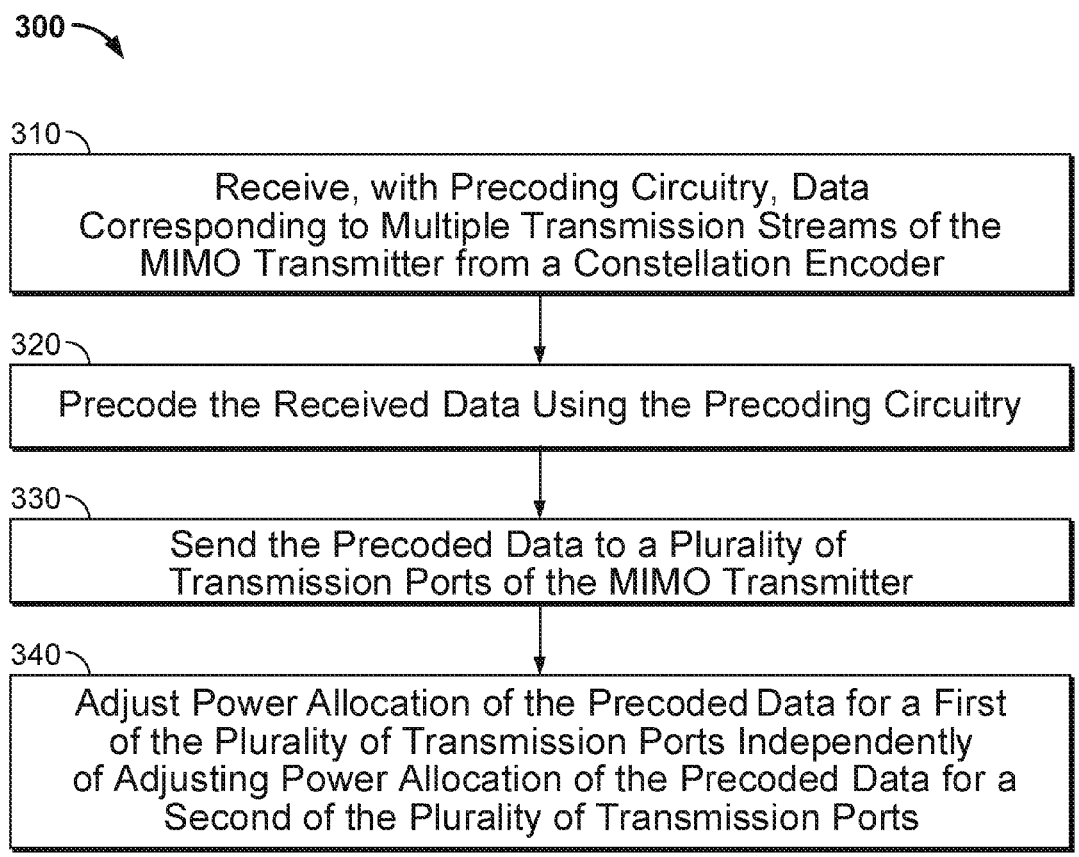
FIG. 3 illustrates a process for individually controlling PSD per transmission port in a MIMO transmitter in accordance with an embodiment of the present disclosure.

FIG. 3 illustrates a process 300 for individually controlling PSD per transmission port in a MIMO transmitter in accordance with an embodiment of the present disclosure. At 310, data corresponding to multiple transmission streams of the MIMO transmitter is received with precoding circuitry from a constellation encoder. For example, precoding circuitry 140 may receive data from constellation encoder 210 (FIG. 2).

At 320, the received data is precoded using the precoding circuitry. For example, precoding circuitry 140 may apply precoding to the received data (FIG. 2).

At 330, the precoded data is sent to a plurality of transmission ports of the MIMO transmitter. For example, precoding circuitry 140 may provide the precoded data to first transmission port 220 and second transmission port 230 based on the stream for which precoding is applied (FIG. 2).

At 340, power allocation of the precoded data for a first of the plurality of transmission ports is adjusted independently of adjusting power allocation of the precoded data for a second of the plurality of transmission ports. For example, control circuitry 240 may adjust power values stored in memories 224 and 234 to control or adjust how much power allocation each power allocation circuitry 222 and 232 applies (FIG. 2). Because memories 224 and 234 may store different power values and can be independently controlled or accessed by control circuitry 240 and respective power allocation circuitry 222 and 232, different amount of power allocation may be applied to the signals between transmission ports 220 and 230. Accordingly, the power allocation of first transmission port 220 may be independently controlled or adjusted from second transmission port 230.

The foregoing describes methods and an apparatus for storing information in a programmable storage device. The above-described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding instructions for performing the process discussed above in one or more computer readable media.

What is claimed is:

1. A method for transmitting data from a transmitter, the method comprising:
sending, using control circuitry, data that has been precoded, corresponding to multiple transmission streams, to first and second transmission ports;
storing a first power value in a first storage location associated with the first transmission port to adjust power allocation of the precoded data for the first transmission port; and
storing a second power value in a second storage location associated with the second transmission port to adjust power allocation of the precoded data for the second transmission port.

2. The method of claim 1, wherein sending the data comprises:
sending the data corresponding to a first of the multiple transmission streams from precoding circuitry to first power allocation circuitry of the first transmission port; and
sending the data corresponding to a second of the multiple transmission streams from the precoding circuitry to second power allocation circuitry of the second transmission port.

3. The method of claim 1 further comprising:
precoding, using precoding circuitry, the data before sending the data to the first and second transmission ports; and
bypassing power allocation circuitry of a constellation encoder such that power allocation is not applied to the data received by the precoding circuitry.

4. The method of claim 1, wherein power allocation applied to the data sent from a constellation encoder to precoding circuitry is scaled so that a same amount of power is applied to the data independently of a number of constellation bits used by the constellation encoder.

5. The method of claim 1 further comprising determining that an amount of a signal transmitted by the first transmission port which has been reflected back to the transmitter is greater than an amount of a signal transmitted by the second transmission port which has been reflected back to the transmitter.

6. The method of claim 5 further comprising increasing the power allocation applied by the first transmission port up to a first ceiling value to be greater than the power allocation applied by the second transmission port up to a second ceiling value that is lower than the first ceiling value.

7. The method of claim 1, wherein each of the first and second transmission ports includes power allocation circuitry, an orthogonal-frequency-division-multiplexing (OFDM) modulator and cyclic prefix and windowing circuitry, and wherein each of the first and second transmission ports is associated with a respective one of a plurality of antennas of the transmitter.

8. The method of claim 1, wherein the amount by which power allocation of the first and second transmission ports is adjusted is based on interference of neighboring signals.

9. The method of claim 1, wherein the data is precoded by multiplying subcarriers of each of the transmission streams by a Singular Value Decomposition (SVD) of a channel matrix.

10. A system for transmitting data from a transmitter, the system comprising:
control circuitry configured to:
send data that has been precoded, corresponding to multiple transmission streams, to first and second transmission ports;
store a first power value in a first storage location associated with the first transmission port to adjust power allocation of the precoded data for the first transmission port; and
store a second power value stored in a second storage location associated with the second transmission port to adjust power allocation of the precoded data for the second transmission port.

11. The system of claim 10, wherein the control circuitry configured to send the data is further configured to:
send the data corresponding to a first of the multiple transmission streams from precoding circuitry to first power allocation circuitry of the first transmission port; and
send the data corresponding to a second of the multiple transmission streams from the precoding circuitry to second power allocation circuitry of the second transmission port.

12. The system of claim 10, wherein the control circuitry is further configured to:
precode, using precoding circuitry, the data before sending the data to the first and second transmission ports; and
bypass power allocation circuitry of a constellation encoder such that power allocation is not applied to the data received by the precoding circuitry.

13. The system of claim 10, wherein power allocation applied to the data sent from a constellation encoder to precoding circuitry is scaled so that a same amount of power is applied to the data independently of a number of constellation bits used by the constellation encoder.

14. The system of claim 10 wherein the control circuitry is further configured to determine that an amount of a signal transmitted by the first transmission port which has been reflected back to the transmitter is greater than an amount of a signal transmitted by the second transmission port which has been reflected back to the transmitter.

15. The system of claim 14 wherein the control circuitry is further configured to increase the power allocation applied by the first transmission port up to a first ceiling value to be greater than the power allocation applied by the second transmission port up to a second ceiling value that is lower than the first ceiling value.

16. The system of claim 10, wherein each of the first and second transmission ports includes power allocation circuitry, an orthogonal-frequency-division-multiplexing (OFDM) modulator and cyclic prefix and windowing circuitry, and wherein each of the first and second transmission ports is associated with a respective one of a plurality of antennas of the transmitter.

17. The system of claim 10, wherein the amount by which power allocation of the first and second transmission ports is adjusted is based on interference of neighboring signals.

18. The system of claim 10, wherein the data is precoded by multiplying subcarriers of each of the transmission streams by a Singular Value Decomposition (SVD) of a channel matrix.

* * * * *